United States Patent
Lisenker

(10) Patent No.: US 6,497,309 B1
(45) Date of Patent: Dec. 24, 2002

(54) MAGNETO-RHEOLOGICAL DAMPER WITH AN EXTERNAL COIL

(75) Inventor: Ilya Lisenker, Miamisburg, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/929,401

(22) Filed: Aug. 13, 2001

(51) Int. Cl.⁷ .................................................. F16F 9/53
(52) U.S. Cl. ................ 188/267.2; 188/267; 188/322.19; 188/322.22
(58) Field of Search .............................. 188/267, 267.2, 188/267.1, 269, 322.22, 322.19, 322.15; 267/140.14, 140.15

(56) References Cited

U.S. PATENT DOCUMENTS

| | | | |
|---|---|---|---|
| 5,277,281 A | 1/1994 | Carlson et al. | 188/267.2 |
| 5,293,969 A * | 3/1994 | Yamaoka et al. | 188/266.5 |
| 5,947,238 A * | 9/1999 | Jolly et al. | 188/267.2 |
| 6,202,806 B1 * | 3/2001 | Sandrin et al. | 188/267 |
| 6,336,535 B1 * | 1/2002 | Lisenker | 188/267 |
| 6,382,369 B1 * | 5/2002 | Lisenker | 188/267 |

* cited by examiner

Primary Examiner—Pam Rodriguez
(74) Attorney, Agent, or Firm—Scott A. McBain

(57) ABSTRACT

An improved magneto-rheological ("MR") fluid damper includes a damper cylinder containing a volume of MR fluid. The cylinder includes an inner surface. A piston assembly is disposed in the cylinder and has an outer surface in slidable contact with the cylinder inner surface. The piston assembly includes a flow gap formed thereabout and an external coil surrounding a portion of the cylinder, the external coil capable of generating a magnetic field across at least a portion of the flow gap.

20 Claims, 2 Drawing Sheets

MAGNETO-RHEOLOGICAL DAMPER WITH AN EXTERNAL COIL

TECHNICAL FIELD

The present invention relates to a magneto-rheological ("MR") fluid damper, and more particularly, to a linear-acting fluid damper suitable for vibration damping in a vehicle suspension.

BACKGROUND OF THE INVENTION

Magneto-rheological fluids are materials that respond to an applied magnetic field with a change in rheological behavior (i.e., change in formation and material flow characteristics). The flow characteristics of these MR fluids change several orders of magnitude within milliseconds when subjected to a suitable magnetic field. In particular, magnetic particles noncolloidally suspended in fluid align in chainlike structures parallel to the applied magnetic field, thus increasing the viscous characteristics, or apparent viscosity, of the MR fluid.

Devices, such as controllable dampers and struts, benefit from the controllable viscosity of MR fluid. For example, linearly acting MR fluid dampers are used in vehicle suspension systems as vibration dampers. At low levels of vehicle vibration, the MR fluid damper lightly damps the vibration, providing a more comfortable ride, by applying a low magnetic field or no magnetic field all to the MR fluid. At high levels of vehicle vibration, the amounts of damping can be selectively increased by increasing the density of the magnetic field and by applying control integration into vehicle suspension systems that sense and respond to vehicle load, road surface condition, and driver preference by adjusting a suspension performance accordingly.

Generally, current linearly acting MR fluid dampers are based on a monotube design with a coil positioned in a piston of the damper. In the monotube design, the piston moves within the fixed length cylindrical reservoir in response to force from a piston rod that extends outside of the cylinder. The monotube approach simplifies sealing of the MR fluid within the monotube reservoir; however, monotube dampers may experience reliability problems arising from the electrical wiring leading to the coil, etc., necessary for generating a magnetic field in or around parts of the piston. Typically, the electrical wiring passes up through a passage in the piston rod to a coil in the piston. Elaborate assembly procedures are required to seal this passage. Even if adequately sealed, the electrical wiring may flex with the movement of the piston, sometimes resulting in breakage of the wires.

In some dampers, it is known to reduce failure from wire flexing by holding the coil stationary with respect to a portion of the reservoir of (e.g., either the inner or outer tube). In particular, in U.S. Pat. No. 5,277,281, a reduced diameter piston moves within a reduced diameter inner tube. A coil, separate from the piston, acts as a valve control for a flow passage between the inner and outer tubes, rather than a coil integral to the piston controlling flow past the piston. Although wire flexing is reduced, the reduced piston diameter correspondingly reduces damping. Also, leaks due to introducing wiring into the reservoir are not avoided.

Consequently, a significant need exists for an MR fluid damper that is more reliable and inexpensive to manufacture while being tolerant of side loads on the damping components and furthermore, reduces the likelihood of pressure leaks from the MR fluid reservoir.

SUMMARY OF THE INVENTION

The present invention provides an MR fluid damper that is of a simpler construction then known dampers and can be manufactured for less cost. However, the MR fluid damper design of the, present invention provides an improved, more reliable performance and substantially increases the reliability of the electrical connection to the coil. One aspect of the invention provides an improved magneto-rheological ("MR") fluid damper including a damper cylinder containing a volume of MR fluid. The cylinder includes an inner surface. A piston assembly is disposed in the cylinder and has an outer surface slidably contacting with the cylinder inner surface. The piston assembly includes a flow gap formed therein and an external coil surrounding a portion of the cylinder, the external coil capable of generating a magnetic field across at least a portion of the flow gap. A pair of ferromagnetic rings are provided, one of which is positioned above and the other of which is positioned below the external coil for directing the magnetic field or flux through the flow gap.

Other aspects of the invention provide a damper wherein the piston assembly includes a first portion having a first diameter and a second portion having a second diameter, the first diameter being less than the second diameter, the second portion including the outer surface in contact with the cylinder inner surface. The MR damper flow gap can be formed along the first portion of the piston assembly. The second portion of the piston assembly can include a plurality of openings. The MR damper can further include a piston rod, a major portion of which is disposed in the cylinder and wherein the piston assembly is secured to an inner end of the piston rod. The piston assembly can be secured to the rod by a pin. The pin can secure the first portion of the piston assembly to the inner end of the piston rod. The outer surface of the second portion of the piston assembly may include a wear resistant coating. The wear resistant coating can include a nickel plating. The wear resistant coating can include an iron alloy including from about 27–50% cobalt and alternately, about 2% vanadium. The wear resistant coating can be sprayed onto the outer surface of the second portion of the piston assembly. The outer surface may be turned and roller burnished. The MR damper may further include a first pair of retaining members positioned in grooves formed in the piston rod at positions above and below the piston assembly and a Belleville spring positioned between one of the first pair of retaining members and the piston assembly to secure the piston assembly to the piston rod. The retaining members may be retaining rings. The extending end of the piston rod opposite the inner end is secured to a housing of the damper by a threaded member. The extending end of the piston rod opposite the inner end may be secured to a housing of the damper by a second pair of retaining members positioned on the inside and the outside of the housing and a Belleville spring can be positioned between one of the pair of retaining members and the housing to secure the piston rod to the housing. The piston rod can be a solid rod. The cylinder can be made of a material that saturates at about 0.5 to about 2 Tesla. The MR damper can further include a gas cup slidingly contained within the cylinder, the gas cup defining a gas chamber containing a gas in one portion of the cylinder, the gas cup configured to seal the MR fluid from the gas chamber. The ferromagnetic rings may include a pair of inner bearings for allowing the ferromagnetic rings and the coil positioned therebetween to slidingly contact the cylinder. The vertical span of the coil and ring assembly may be a length at least equal to a vertical span of the piston.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DESCRIPTION OF THE PREFERRED EMBODIMENT

Figure 1:
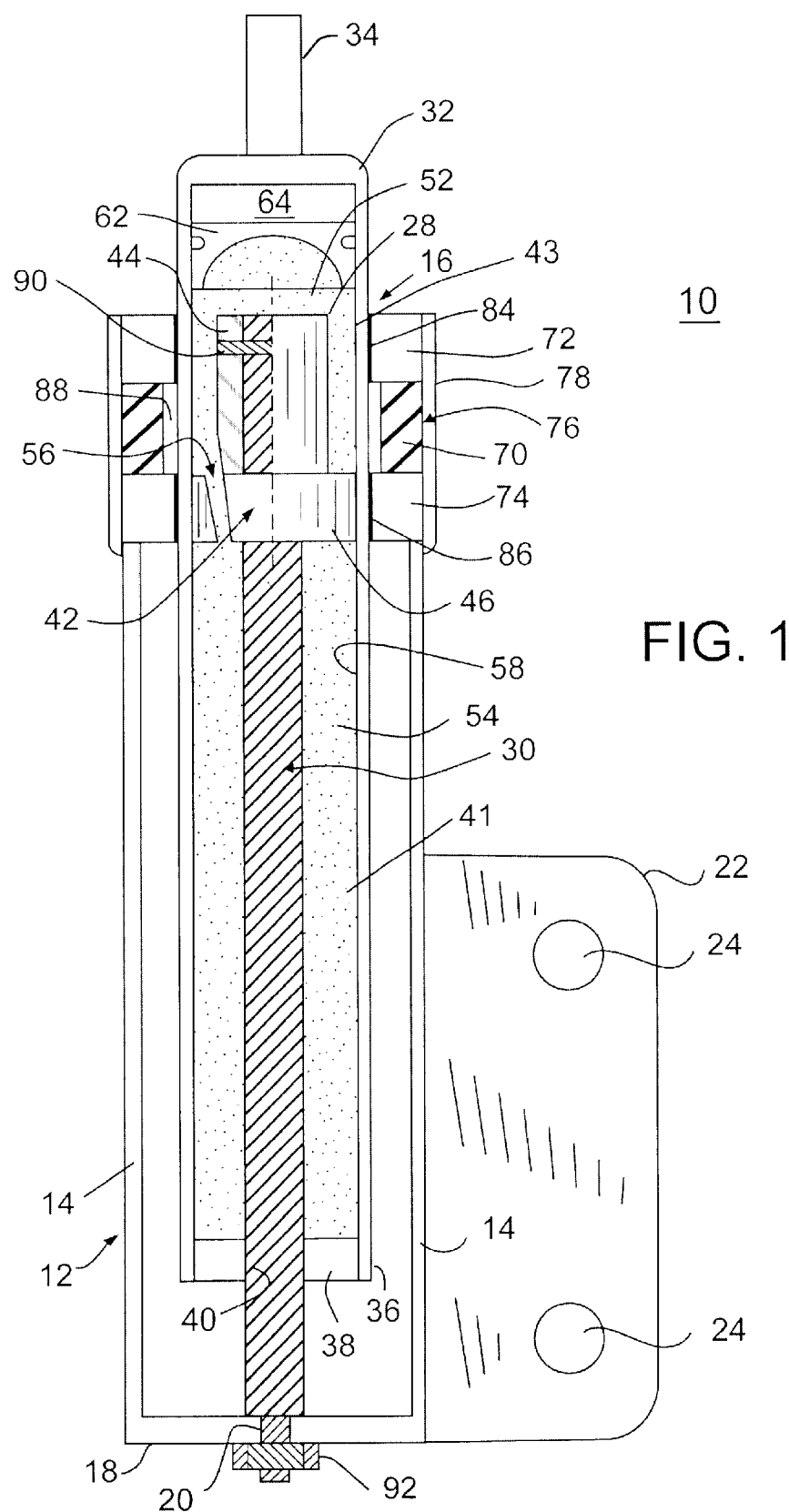
FIG. 1 is a sectional view of one embodiment of a magneto-rheological damper in accordance with the present invention.

For purposes of this description, words such as "upper", "lower", "right", "left" are applied in conjunction with the drawing for purposes of clarity. As is well known, dampers may be oriented in substantially in any orientation, so these directional words cannot be used to imply the particular absolute directions for damper consistent with the invention.

Referring to the drawings, illustrated in FIG. 1 is a linearly acting magneto-rheological (MR) fluid damper, in particular, a strut generally illustrated at 10. In general, the strut is designed for operation as a load bearing and shock-absorbing device within the vehicle suspension system. The strut 10 can be connected between the sprung (body) and unsprung (wheel assembly) masses (not shown) as is known in the art. The strut 10 may include housing 12 including a housing tube or cylinder 14 with an open end 16 and a closed end 18. The closed end 18 includes an opening 20. A mounting bracket 22 adjacent the closed end 18 is secured to cylinder 14 by any suitable means such as welding. The mounting bracket 22 has suitable openings 24 for connection to the unsprung mass of the vehicle at a location such as the steering knuckle (not illustrated).

A piston assembly 28 is connected to a piston rod 30 and is positioned within the housing tube 14. Any suitable means may be used to fix the assembly 28 to the rod 30. In the illustrated embodiment, the piston 28 is connected to the rod by pinning the piston to the rod with a transverse cross-dowel or pin 90 or the like. The piston rod 30 extends through and is attached to the housing 12 at the opening 20. In the illustrated embodiment, the rod 30 is secured to the housing portion 18 by way of a threaded nut 92. The piston assembly 28 is slidingly received within a damper body tube 32 that includes a first end 34 at an outboard position adapted to be connected to the sprung mass of the vehicle and includes a second end 36 at an inboard position. A rod guide 38 supports the second end 36 of the damper body tube 32 about the piston rod 30. An opening 40 in the rod guide 38 allows the damper body tube 32 to move longitudinally inboard and outboard with respect to the housing 12. The damper body tube 32 thus forms a fluid-tight cylindrical reservoir 41.

The piston assembly 28 includes a solid piston core or stepped cylinder 42 containing ferromagnetic material, such as soft steel or sintered iron. The piston core 42 preferably includes a narrowed portion 44 and an extended portion 46. An annular flow gap 43 is formed about the narrow portion 44, between piston portion 44 and cylinder 32. A plurality of openings or orifices 56 are formed through extended portion 46 to permit fluid to pass from a compression chamber 52 and an extension chamber 54 of reservoir 41.

A non-magnetic cap (not shown) may be provided the piston 42 at the end near the narrow portion 44 as is known in the art to reduce flux leakage to the damper tube 14. Any magnetic flux leakage from the rod 30 to the tube 14 that may occur only improves performance by increasing flux density in the flow gap 43. The outer surface of the extended portion or outer step portion 46 of the piston 42 can be coated with a thin wear resistant coating such as electroless nickel plating. The coating may be a thicker coating such as a thermal spray coating, provided such coating is hard enough to withstand the wear and has "soft" magnetic properties to minimize residual magnetization. One of such coatings could be a 27–50% Co, 2% V, Fe bal. Alloy that is sprayed on the surface, turned and roller burnished to increase the hardness and improve the surface finish. An outer surface of the piston portion thus prepared bears on inner surface 58 of tube 32.

The cylinder 32 can be made from medium or low carbon steel and allowed to saturate at a value of about 2 Tesla. In the alternate, a material may be chosen to saturate at a lower flux density from about 0.8 to about 1.5 Tesla thereby decreasing the amount of flux "lost to the tube" and further improving magnetic performance. The optimum saturation value should be such that the portion of tube 36 in contact with the piston 42 is nearing saturation. The magnetic field energy that is dissipated through other portions of the damper body tube 36 is referred to as "lost to the tube" since it does not interact with MR fluid contained between shear surfaces of the piston assembly 28 and damper body tube 32.

The MR fluid may be any conventional fluid including magnetic particles such as iron or iron alloys which can be controllably suspended within the fluid by controlling a magnetic field, thereby varying the flow characteristics of the MR fluid through flow gap 43 defined in piston portion 46. Varying the magnetic field thereby controls the flow characteristics of the MR fluid to achieve a desired damping effect between the sprung and unsprung masses of the vehicle for a given application.

Fundamentally, during damping, MR fluid present in one of the chambers 52, 54 of the damper body tube 32 flows through flow gap 43 from, for example, extension chamber 54 to compression chamber 52, as the tube 32 moves outboard with respect to the housing 12.

A gas cup 62 may also be carried in the damper body tube 32 between the piston assembly 28 and the first (outboard) end 34. The gas cup 62 slides along the inner surface 58 of damper body tube 32, separating out a compensation chamber 64 from compression chamber 52. While the extension chamber 54 and compression chamber 52 carry a supply of MR fluid, the compensation chamber 64 may carry a compressible nitrogen gas supply. During extension and compression directed travel of the damper body tube 32 relative to the piston assembly 28, a decreasing or an increasing volume of the piston rod 30 is contained within the damper body tube 32 depending on the strut position of the strut 10. In order to compensate for this varying volumetric amount of the piston rod 30 within the fluid filled chambers 52, 54, the gas cup 62 slides, compressing or expanding the compensation chamber 64.

An external coil 70 generates the magnetic field across the flow gap 43 to the piston assembly 28. The external coil 70 encompasses a portion of the damper body tube 32 corresponding to, and stationary with respect to, the piston assembly 28. To concentrate the magnetic field, the external coil 70 is longitudinally placed between a pair of ferromagnetic rings 72, 74, forming an external coil assembly 76.

The external coil assembly 76 is advantageously contained within an external coil crimp casing 78 that provides structural support when the open end 16 of the housing 12 is deformed around the external coil assembly 76 to form an attachment. Any suitable method of fixing the coil assembly 76 may be used to attach the assembly 76 in place about the tube 32.

An internal surface of the external coil assembly 76 laterally supports the damper body tube 32. In particular, the assembly 76 includes a pair of plain bearings 84, 86 that are pressed into the external coil assembly 76 and bear against the damper body tube 32. The bearings 84, 86 concentrically support the damper body tube 32 with respect to the external coil assembly 76. This provides a fluid-tight chamber 88 between the bearings 84 and 86, which is filled with a lubricating oil. The fluid tight chamber 88 and bearings 84, 86 can be protected by scraper seals (not shown) on each axial end of the assembly 76 and are in contact with the damper body tube 32.

An advantage of placing the external coil 70 outside of the cylindrical reservoir 41 is that electrical wiring (not shown) to the external coil 70 is readily installed through the housing tube 14. In addition, the electrical wiring is secured to the housing 12 so that wire flexure and failure is reduced or prevented.

Figure 2:
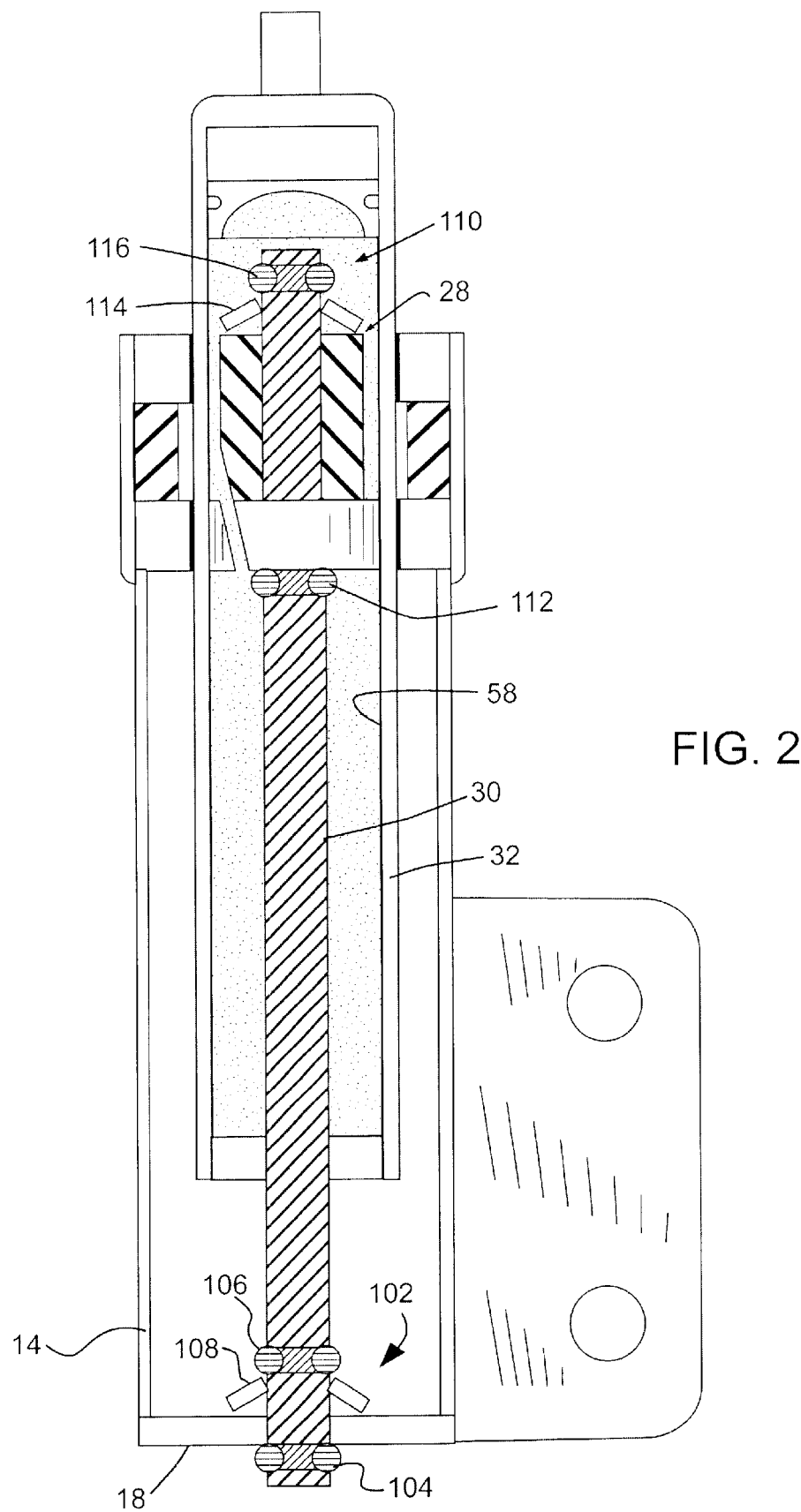
FIG. 2 is a sectional view of another embodiment of a magneto-rheological damper in accordance with the present invention.

Referring to FIG. 2, an alternate means of securing the rod and piston is illustrated with the same elements as shown in the above illustration being referred to with the same reference characters. This embodiment uses a number of retaining rings and Belleville springs or washers to retain the rod 30 to the housing 14 and the piston assembly 28 to the rod 30.

In particular, the piston assembly 28 is secured to the free end or upper end 110 of the rod 30. A first retaining ring or circlip 112 is positioned in a groove of the rod 30. The piston assembly 28 is slid onto the end 110 of the rod 30. A Belleville spring or washer 114 is positioned upon the end of the assembly 28 adjacent the upper end 110. A second retaining ring 116 is positioned in a groove of the rod 30 to trap the Belleville spring 114 between the assembly 28 and the ring 116. It will be understood that the spring or washer 114 will be provided with a pre-load or bias to secure the assembly 28 to the rod 30 and prevent movement or misalignment of the assembly with respect to the bore 58 of the tube 32.

The rod 30 may be held to the housing 14 at a lower end 102 of the rod. A first (lower) retaining ring or circlip 104 is held in a groove of the rod outside the lower end 18 of the housing 14. A second (lower) retaining ring 106 is held in a groove of the rod 30 just inside the lower end 18. Between the second ring 104 and the lower end 18 of the housing 14 a Belleville spring 108 is positioned to bias the first ring 104 against the lower end 18 and secure the rod 30 thereto in a similar preload manner as above. It will be understood that maintaining the rod 30 in a secure fashion with respect to the housing 14 helps to align the piston assembly 28 concentrically within the cylinder 32.

The use of an external coil improves the reliability of the electrical connection thereto and allows higher flux densities to be generated, improving performance of the damper. The stepped piston assembly includes both a flow gap and a bearing surface, lowering complexity and cost of the assembly. Since the bearing surface is magnetic, (previously provided by a stainless steel plate or the like) stainless steel (non-ferrous) components are eliminated from the MR damper.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A magneto-rheological ("MR") fluid damper comprising:

a cylinder having an inner surface and containing a volume of magneto-rheological fluid;

a piston assembly disposed in the cylinder and having an outer surface in slidable contact with the cylinder inner surface, wherein the piston assembly includes a flow gap formed therein:

an external coil surrounding a portion of the cylinder, the external coil capable of generating a magnetic field across at least a portion of the flow gap; and a pair of ferromagnetic rings, one of which is positioned above and the other of which is positioned below the external coil for directing the magnetic field through the flow gap.

2. The MR damper of claim 1 wherein the piston assembly includes a first portion having a first diameter and a second portion having a second diameter, the first diameter being less than the second diameter, the second portion including the outer surface in contact with the cylinder inner surface.

3. The MR damper of claim 2 wherein the flow gap is formed between the first portion of the piston assembly and the cylinder inner surface.

4. The MR damper of claim 3 wherein at least one opening is formed in the second portion of the piston assembly to allow flow of magneto-rheological fluid through the piston assembly.

5. The MR damper of claim 2 further comprising a piston rod, a major portion of which is disposed in the cylinder and wherein the piston assembly is secured to an inner end of the piston rod.

6. The MR damper of claim 5 wherein the piston assembly is secured to the rod by a pin.

7. The MR damper of claim 6 wherein the pin secures the first portion of the piston assembly to the inner end of the piston rod.

8. The MR damper of claim 2 wherein the outer surface of the second portion of the piston assembly includes a wear resistant coating.

9. The MR damper of claim 8 wherein the wear resistant coating includes a nickel plating.

10. The MR damper of claim 8 wherein the wear resistant coating includes an iron alloy including from about 27–50% cobalt.

11. The damper of claim 10 wherein the outer surface of the second portion of the piston assembly is turned and roller burnished.

12. The MR damper of claim 5 further comprising:

a first pair of retaining members positioned in grooves formed in the piston rod at positions above and below the piston assembly and a Belleville spring positioned between one of the first pair of retaining members and the piston assembly to secure the piston assembly to the piston rod.

13. The MR damper of claim 12 wherein the retaining members are retaining rings.

14. The MR damper of claim 12 wherein an extending end of the piston rod opposite the inner end is secured to a housing of the damper by a threaded member.

15. The MR damper of claim 12 wherein an extending end of the piston rod opposite the inner end is secured to a housing of the damper by a second pair of retaining members positioned on the inside and the outside of the housing and wherein a Belleville spring is positioned between one of the second pair of retaining members and the housing to secure the piston rod to the housing.

16. The MR damper of claim 5 wherein the piston rod is a solid rod.

17. The MR damper of claim 16 wherein the cylinder is made of a material that saturates at a value between about 0.8 and 1.5 Tesla.

18. The MR damper of claim 1 further comprising:
a gas cup slidingly contained with the cylinder, the gas cup defining a gas chamber containing a gas in one portion of the cylinder, the gas cup configured to seal the MR fluid from the gas chamber.

19. The MR damper of claim 1 wherein the ferromagnetic rings include a pair of inner bearings for allowing the ferromagnetic rings and the coil positioned therebetween to slidingly contact the cylinder.

20. The MR damper of claim 1 wherein the vertical span of the coil is a length at least equal to a vertical span of the piston.

* * * * *